Jan. 12, 1960 L. G. KAPLAN 2,920,465
TORQUE LIMITING CLUTCH ASSEMBLY WITH HEAT
DISSIPATING AND LUBRICATING MEANS
Filed Dec. 24, 1958 2 Sheets-Sheet 1
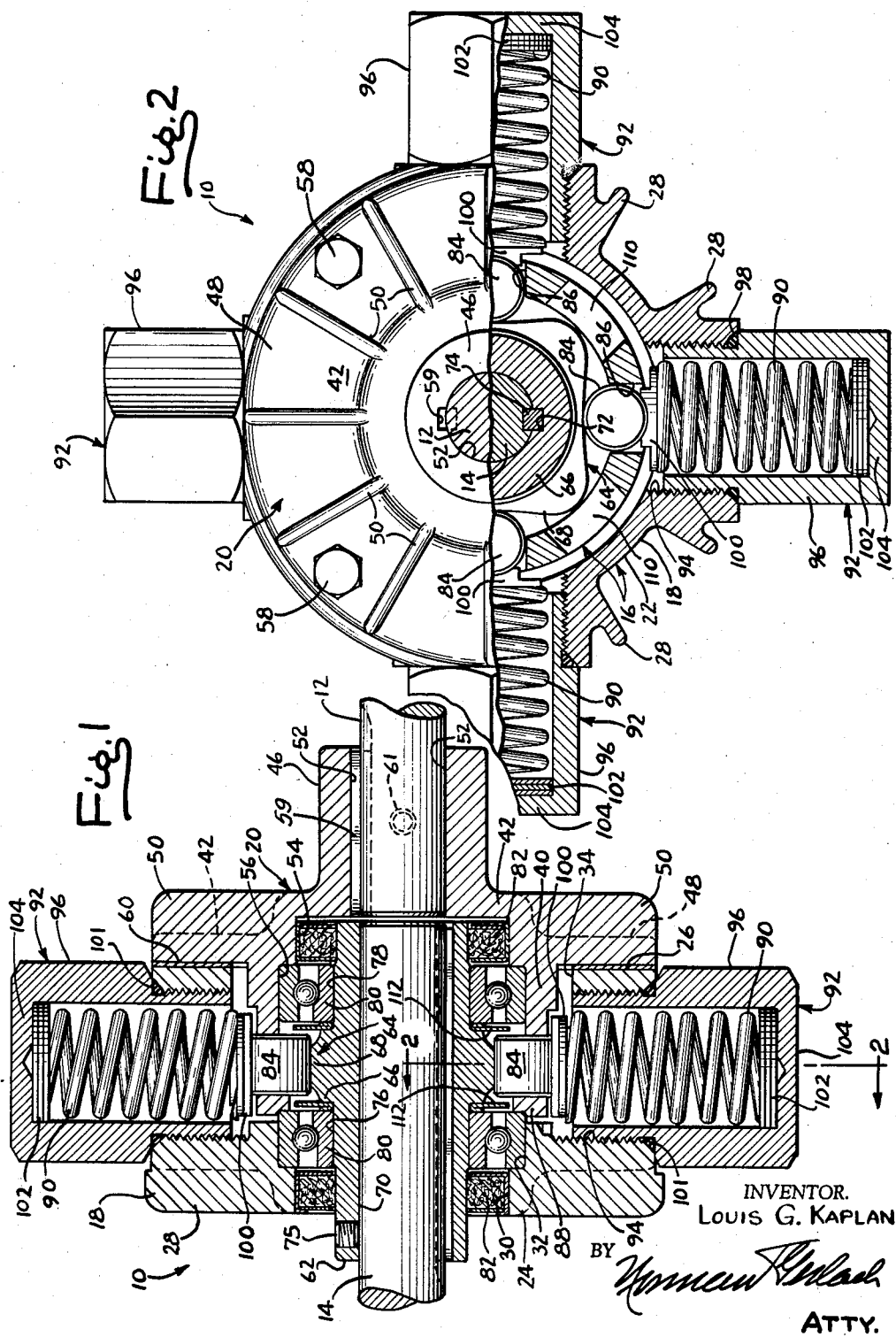
INVENTOR.
Louis G. Kaplan
BY
ATTY.

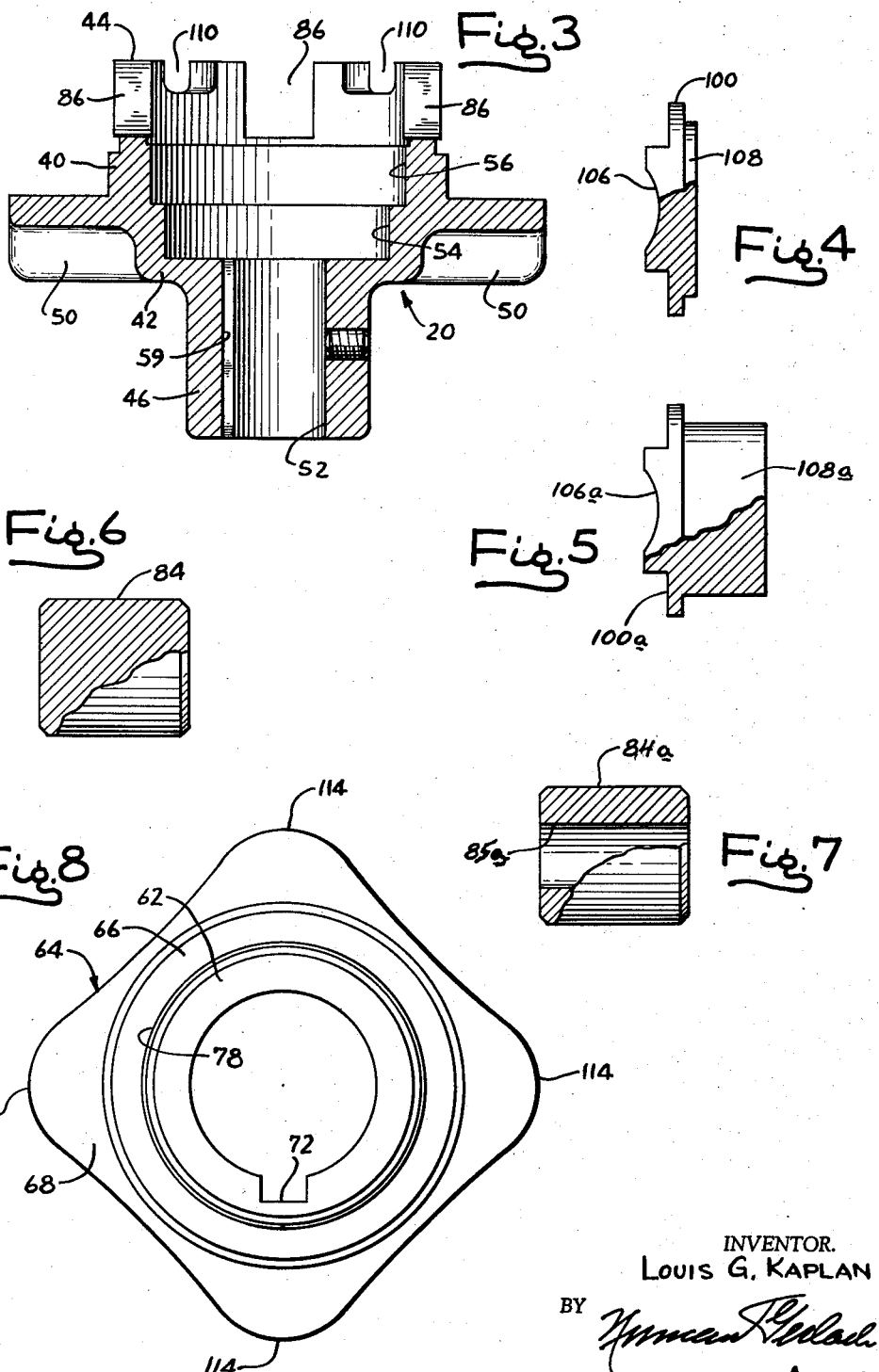

United States Patent Office 2,920,465
Patented Jan. 12, 1960

2,920,465

TORQUE LIMITING CLUTCH ASSEMBLY WITH HEAT DISSIPATING AND LUBRICATING MEANS

Louis G. Kaplan, Evanston, Ill., assignor to Cullen-Friestedt Company, Chicago, Ill., a corporation of Illinois Application December 24, 1958, Serial No. 782,762

8 Claims. (Cl. 64—29)

The improved torque limiting clutch assembly comprising the present invention has been designed for use primarily in connection with lifter mechanisms of the type shown and described in United States Letters Patent No. 2,256,896, granted on September 23, 1941 and entitled "Lifter." When put to such use, the clutch assembly is suitably interposed in the power train leading to the input drive shaft for the lifter mechanism and it operates to prevent overloading of the electric driving motor associated with the lifter mechanism or damage to the lifter mechanism itself. The invention is however capable of other uses and the same may, if desired, with or without suitable modification, be employed in connection with other machines or instrumentalities where a condition of jamming may give rise to the problem briefly outlined above. The mechanism of the present invention may, for example, find use in the transmission of power from an electric or other driving motor associated with a sump with a chain drag for pulling automotive vehicles through various washing cycles, or with material conveyors, to mention but a few contemplated uses. In fact, torque limiting clutch assemblies constructed in accordance with the principles of the present invention will be found useful in connection with a large variety of unattended automatic mechanisms which are likely to become jammed and which, when so jammed, would otherwise cause damage to itself, the mechanism or work on which it operates, or the motor or other driving instrumentality by means of which it is supplied with power. Irrespective however of the particular use to which the present invention may be put, the essential features thereof are at all times preserved.

The prevention of overload in a driving mechanism by automatic mechanical means, as distinguished from electrical means such as overload circuit breakers and the like which invariably involved shut-down periods, has resulted in various proposals for incorporating in the train of driving mechanism a clutch device capable of slipping when an overload occurs so as to limit the load on the prime mover, as well as to reduce the driving torque which is applied to the input shaft of the apparatus being driven. Hydraulic clutches are commonly in use where bulk is not a consideration. Where friction clutch devices are employed for this purpose, they are in need of constant adjustment.

A class of clutch devices employing plungers, balls, rollers and the like which operate in sockets or cam troughs in such a manner that when a predetermined degree of torque differential between a driving shaft and a driven shaft takes place these elements will be forced out of their sockets or troughs to permit slippage has been proposed. In general these devices, as currently constructed, are extremely noisy in operation and, when put to heavy duty use, invariably involve destructive impact between the relatively moving parts thereof despite attempts to properly lubricate the same. Furthermore, such clutch devices require resetting after each period of slip operation. It is to this latter type of clutch device that the present invention pertains, the invention involving novel features whereby the above-noted difficulties are obviated.

It is among the principal objects of the present invention to provide a torque-limiting clutch assembly of this general character which involves a smooth transition from a condition of clutch engagement to a condition of clutch release where slippage occurs, as for example when the drive shaft is maintained stationary and the driving shaft rotates at full speed.

Another and important object of the invention in a torque limiting clutch of this general character is to provide a mechanism which is likely and automatically responsive to loads such as arise in connection with acceleration of the driving shaft or inertia of the driven shaft and its load so that the additional torque required for acceleration will automatically be supplied.

A still further object of the invention is to provide a torque limiting clutch of this sort which, while a condition of clutch engagement obtains is capable of transmitting an appreciably large amount of torque to the driven shaft, yet which immediately upon exceeding of the maximum degree of torque for which the mechanism is set, will automatically effect a condition of release so that thereafter little if any countertorque will be applied to the driving shaft and little if any torque will be applied to the driven shaft so that a substantially free overrunning of the clutch as a whole may be attained.

Yet another object of the invention is to provide a clutch mechanism which may be employed as a torque limiting clutch for overload purposes as described above, or which, alternatively, may be employed as an impact driving mechanism or speed reducing device.

An important feature and additional object of the invention resides in a novel means for effecting dissipation of any heat which may be generated as a result of slippage between the various clutch parts when clutch overrunning conditions take place. A closely related object of the invention is to provide novel and effective means for lubricating the various relatively moving and interengaging clutch parts, such means involving a forced lubrication of the parts arising by virtue of a novel pumping action which is caused to take place within the body of lubricant contained within the clutch housing.

The provision of a clutch assembly of the character indicated above which is relatively simple in its construction and which may therefore be manufactured at a low cost; one which is possessed of relatively few parts, thereby further contributing toward economy of manufacture; one which is rugged and durable and which therefore is unlikely to get out of order; one which is smooth and silent in its operation, particularly when a condition of clutch slippage occurs; one which is capable of being easily assembled and disassembled for purposes of inspection of parts, replacement or repair thereof; one which is small and compact in comparison with many hydraulic and other clutch devices designed for the same duty; one wherein the operative parts thereof are sealed in lubricant so that no attention need be given the apparatus in this regard for the entire life of the same; one in which slippage may take place indefinitely without danger of clutch failure; and one which otherwise is well adapted to perform the services required of it are further desirable features which have been borne in mind in the production and development of the present invention.

Other objects and advantages of the invention not at this time enumerated will become more readily apparent as the following description ensues.

In the accompanying three sheets of drawings forming a part of this specification several embodiments of the invention have been shown.

In these drawings:

Fig. 1 is a sectional view taken substantially centrally and longitudinally through a torque limiting clutch assembly constructed in accordance with the principles of the present invention;

Fig. 2 is a partial sectional view taken substantially along the line 2—2 of Fig. 1 in the direction indicated by the arrows;

Fig. 3 is a sectional view taken substantially centrally and longitudinally through one element of a two-piece casing assembly employed in connection with the invention;

Fig. 4 is a side elevational view, partly in section, of a cam follower seat member employed in connection with the invention;

Fig. 5 is a side elevational view similar to Fig. 4 showing an alternative form of seat member;

Fig. 6 is a side elevational view, partly in section, of a cam follower roller employed in connection with the invention; and Fig. 7 is a side elevational view similar to Fig. 6 of an alternative form of cam follower roller.

Fig. 8 is an end view of the generally square cam member.

Briefly, the torque limiting assembly of the present invention, in the form selected for illustration herein, involves in its general organization two principal cooperating connecting or clutch members, one of which is adapted to be operatively connected in driven relationship to a rotary actuating or power shaft or device, and the other of which is adapted to be connected in driving relationship to an input shaft of the particular mechanism with which the present torque limiting clutch assembly is associated and which, for example, may be the input shaft of a jaw type lifter device or the like. The two clutch members have cooperating parts which serve normally to positively yet yieldingly connect the power shaft to the input shaft of the mechanism to be actuated, with one of the clutch members being yieldable to permit the member which is connected to the power shaft to rotate relatively to the clutch member which is connected to the input shaft of the mechanism being actuated when a predetermined degree of pressure or torque is applied to such input shaft. As will be more particularly pointed out presently, the clutch mechanism of the present invention is in the nature of a slip-clutch having certain parts that roll tractionally relative to each other and other parts that slide relative to each other when such predetermined torque is attained and novel means for dissipating any heat which may be generated incident to any frictional forces which may be developed by such rolling action.

Referring now to the drawings in detail and in particular to Figs. 1 and 2, the clutch mechanism of the present invention has been designated in its entirety at 10 and it is operatively disposed between a power shaft 12 and a shaft 14 which itself may constitute a power input shaft for the lifter or other mechanism (not shown) with which the present clutch assembly is associated. The shaft 12 constitutes the power input shaft and the shaft 14 constitutes the power output shaft of the clutch assembly 10 and, as a consequence, these two shafts will hereinafter be referred to simply as the input and output shafts respectively.

The assembly 10 involves in its general organization a two-part separable composite housing or casing 16 including an outer end section 18 and an inner end section 20. The outer end section 18 is generally of cup-shape design and it is comprised of a generally cylindrical wall 22 and a radial end wall 24. The end of the casing section 18 opposite the end wall 24 provides an open annular rim 26. The exterior surface of the casing section 18 is provided with a series of integral spaced radially extending ribs 28 which extend along both the end wall 24 and cylindrical wall 22, the nature and function of which ribs will be described presently. While twelve such ribs are employed in the illustrated embodiment of the invention, with the ribs being equally spaced, it will be understood that a greater or lesser number of such ribs may be employed if desired. The casing section 18 is formed with an axial bore 30 which extends through the end wall 24, the bore adjoining a somewhat larger bore 32 provided partially in the end wall 24 and partially in the cylindrical wall 22 and which in turn adjoins a still larger cylindrical cavity 34 which is afforded by the inner cylindrical surface of the cylindrical wall 22.

The casing section 20 is likewise generally of cup-shape design and it includes a cylindrical wall 40 and a radial end wall 42. The end of the housing 20 remote from the end wall 42 terminates in a circular interrupted rim 44. The end wall 42 is formed with a central hub portion 46 while the cylindrical wall is provided with a radially extending external bolting flange 48. The radial wall 42 is formed with a series of radially extending external ribs 50 corresponding in number to the ribs 28 and in longitudinal alignment with the latter when the two casing sections are assembled upon each other. The casing section 20 is formed with an axial bore 52 therethrough adjoining a larger counterbore 54 which in turn adjoins a still larger counterbore 56.

The two casing sections 18 and 20 are assembled upon each other by inserting the cylindrical wall portion 40 of the section 20 within the cylindrical wall 22 of the section 18 with the two walls extending coaxially. A series of four clamping bolts 58 extend through the radial flange 48 of the section 20 and are threadedly received in the rim 26 of the section 18. A sealing gasket 59 is interposed between the rim 26 and inside face of the radial flange 48 and is adapted to be compressed when the bolts 58 are tightened.

The composite casing structure 16 described above constitutes the rotatable input element of the clutch assembly and it is adapted to be operatively driven by and to rotate in unison with the power input shaft 12. Accordingly, the shaft 12 is adapted to extend into the bore 52 and have its end region keyed as at 59 and anchored in position within the bore by means of a suitable set screw 60. Although in the present illustrated form of the invention such a direct connection between the input shaft 12 and casing 16 is employed, it will be understood that if desired the hub portion 46 of the casing section 20 may be keyed to receive thereon a sprocket, sheave, gear or the like by means of which it may be operatively connected to a rotary power input member.

The output member of the clutch assembly 10 is in the form of a generally cylindrical member or cam shaft 62 which is preferably but not necessarily of hollow tubular construction and which has integrally formed in the medial regions thereof a cam enlargement 64 which constitutes a cam proper. The cam portion 64 of the cam shaft 62 is formed with a central circular hub portion 66 (Fig. 8) and a somewhat narrower rim region 68, the latter being generally square in transverse radial cross section. The tubular cam shaft 62 is formed with a longitudinal bore 70 therethrough having a keyway 72 formed therein whereby the cam shaft may be operatively keyed as at 74 to one end of the output shaft 14 when an end of the latter is inserted into the bore 70. A set screw 75 serves to anchor the end of the shaft 14 within the bore 70. The external diameter of the tubular cam shaft 62 is slightly increased on opposite sides of the cam enlargement 62 thus providing a pair of cylindrical bearing surfaces 76 and 78 which in the assembled structure are disposed in radial opposition to the counterbores 32 and 56 respectively and which pairs of opposed surfaces receive therebetween respective roller bearing units 80 by means of which the cam shaft 62 as a whole is rotatably journalled within the composite casing 16. Conventional oil seals 82 are disposed on the outer sides of the bearings 80 between each bore 30 and its opposing counterbore 54 and the cam shaft 62. These are provided for the purpose of retaining a quantity or supply of a suitable lubricant or grease within the interior of the casing 16.

The generally square cam 64 is designed for cooperation with a series of four cylindrical cam follower rollers 84 which are maintained within the casing 16 at spaced regions which are 90° apart by means of a cage structure which is afforded by the forward rim portion 44 of the casing section 20. Accordingly, the forward rim of the section 20 is slotted inwardly as at 86 at four regions therearound, the regions being spaced 90° apart and the slots being relatively deep. The slots 86 are rectangular and the side walls thereof are spaced apart a distance substantially equal to or sligthly larger than the diameter of the various rollers 84 so that each roller may be positioned within one of the slots 86 where it will be confined against relative circumferential shifting movement therearound. The longitudinal extent, i.e. the depth of the various slots 86, is substantially equal to the longitudinal extent of the various rollers 84 so that each roller may be entirely encompassed by one of the slots and be capable of radial shifting movement relative to the longitudinal axis of the casing 16 in order that it may move toward and away from the axis of rotation of the cam enlargement 64. The rollers 84 are held against axial shifting within the outer ends of the slots 86 by means of a retaining ring 88 which surrounds the cam shaft 62 and which is interposed between the rim 44 of the casing section 20 and one of the roller bearing assemblies 80.

Each cam follower roller 84 is normally urged radially inwardly of the casing 16, i.e. it is normally maintained in tractional engagement with the outer periphery of the square cam 64, under the influence of a spring 90 which is enclosed within a cylindrical spring cap or retainer 92 the inner rim region of which is threadedly received within a radial opening 94 provided in the cylindrical wall 22. The four openings 94 are spaced apart 90° circumferentially about the wall 22. The head portion 96 of each spring cap is of hexagonal configuration and is designed for cooperation with a suitable tool such as a wrench whereby the cap may be threaded into its respective opening 94 to a home position wherein a shoulder 98 bears against the rim of the opening 94. To prevent leakage of the lubricant from within the casing 16, the rim of each opening 94 may be relieved to afford clearance for an O-ring seal 101. Each spring 90 bears at one end against a seat member 100 (see also Fig. 4) and at the other end against one of a series of shims 102 which may be placed within the cap member 92 so as to rest upon the outer end wall 104 of the latter as shown in Figs. 1 and 2.

Referring now to Fig. 4, each seat member 100 is in the form of a cylindrical body of disk-like configuration having a semi-cylindrical concave roller bearing surface or depression 106 formed on one side thereof and having a spring retaining pilot post 108 formed on the other side thereof. The seat member 100 is interposed between the spring 90 and roller 84 with the cylindrical surface of the roller frictionally engaging the bearing surface 106 and with one end of the spring encircling the pilot post 108.

As best seen in Figs. 2 and 3, the forward rim 44 of the casing section 20 is formed with a series of four oil grooves or slots 110, these slots being disposed 90° apart and being arranged intermediate the four cam follower roller retaining slots 86. The function of the slots 110 will be described when the operation of the present clutch assembly is set forth.

Surrounding the cam shaft 62 and straddling the hub portion 66 of the cam enlargement 64 are a pair of heat-dissipating and heat-shielding rings 112 which extend radially outwardly from the cam shaft and project into the annular space existing between the various rollers 84 and the roller bearing assemblies 80 as seen in Fig. 1. The function of these rings 112 will likewise be set forth presently.

The above-described torque limiting clutch assembly is capable of operating effectively with the power input shaft 12 operatively connected to either of the composite casing 16 or to the tubular cam shaft 62. To maintain consistency of description, the operation of the assembly will be set forth on the assumption that the shaft 12 is received within the bore 52 of hub portion 46 of the casing section 20 as shown in Fig. 1 while the output shaft 14 is received within the bore 70. The apparatus is effective whether the power shaft 12 be rotated in a clockwise direction as viewed in Fig. 2 or in a counterclockwise direction, it being convenient herein to describe the operation when the shaft 12 rotates clockwise.

As long as the torque which it is desired to transmit from the shaft 12 to the shaft 14 remains below the predetermined minimum for which the apparatus is initially adjusted, as evidenced by the character and number of shims 102 employed, by the rating of the springs 90 and other factors having a bearing upon the inward radial pressure applied to the various rollers 84, the rollers will assume positions wherein they bear against the outer surface of the cam 64 at identically corresponding positions which are located between adjacent corner regions of the generally square cam enlargement or cam proper 64. While this cam 64 has heretofore been referred to as being generally square, it preferably is formed with slightly concave sides providing shallow cam depressions 113 and rounded corner regions providing curved cam lobes 114 (Fig. 8). The exact positions of the rollers 84 will depend upon the countertorque offered by the load. The driving torque applied to the shaft 14 by the shaft 12 is but slightly dependent upon friction inasmuch as the contact between the cam follower and the cam is of a rolling nature and inasmuch as the lubricant maintained within the casing 16 reduces the amount of friction involved to a minimum and is conducive toward low heat generation when slippage occurs as will be described presently. Mathematical formulae are available on the basis of spring pressure, cam dimensions and other factors for ascertaining the exact positions of the cam rollers relative to the surface of the cam protuberance 64 but it is deemed sufficient for descriptive purposes herein to state that, in general, the greater the torque differential, the closer will be the positions of the cam rollers 84 to the apices of the cam lobes 114 along the flank positions of the cam.

At such time as the predetermined degree of torque is exceeded, and the countertorque offered by the shaft 14 is so high that the springs 90 can not maintain their respective rollers 84 in relatively stationary contact with the surface of the cam 64, the rollers 84 will roll over the lobes in smooth fashion under constant lubricating conditions so that little heat will be generated. It may be assumed that when such a condition arises and such slippage occurs, the shaft 14 may become stationary although not necessarily so since under special circumstances the apparatus may function as a speed reduction device or impact driver.

In the accompanying drawings four lobes 114 and four cam followers 84 have been shown on the surface of the cam 64 for illustrative purposes but it will be understood that a greater or lesser number of such lobes and followers may be employed if desired. Furthermore it is contemplated that, if desired, the number of lobes and the number of followers employed need not be numerically equal.

In the case of a three lobed cam, the cam contour would assume a generally triangular configuration instead of the square configuration illustrated herein. The number of lobes is not important insofar as the principle of operation of the apparatus is concerned. The number of lobes selected for any given installation will be determined by various factors such as spring size, clutch capacity and the like, it being understood, of course, that the maximum torque which may be transmitted from the clutch input to the clutch output will be a direct function of the combined pressure offered by the various springs employed. For example, in large installations where the overall size of the cam 64 is relatively great, sufficient linear extent of the cam depressions 113 may be afforded to justify the use of five or six cam lobes.

Considering now the operation of the clutch assembly prior to the time that slippage takes place, the torque differential at which release of the clutch takes place, i.e. the point at which the mechanism no longer effects a direct drive from the shaft 12 to the shaft 14 but, instead, allows for slippage as described above, is modified to a certain extent by the rotative speed of the two shafts during normal running operations. If the speed is relatively low, substantially full spring pressure on the rollers 84 will be effective. If the speed is relatively high, the centrifugal force acting upon the various radially shiftable elements of the clutch, i.e. the rollers 84, seats 100, and portions of the springs 90 must be subtracted from the above-mentioned torque-controlling force.

From the above considerations, it will be appreciated that the predetermined desired degree of torque application through the clutch assembly at which clutch release is to take place may be conveniently varied by several methods including (1) varying the rate of the springs 90; (2) by increasing or decreasing the total combined thickness of the shims 102; (3) by varying the total mass of the rollers 84; and (4) by varying the total mass of the spring seats 100. Accordingly in Figs. 6 and 7, alternative forms of cam rollers have been shown. In Fig. 6 the roller 84 is in the form of a solid cylindrical body while in Fig. 7 the roller 84a is in the form of a tubular cylindrical body having lesser mass than the mass of the body 84 by virtue of the central bore 85a provided in the body. Similarly, in Figs. 4 and 5, alternative forms of spring seats have been shown. In Fig. 4 the seat 100 is formed with a relatively short pilot boss 108 while in Fig. 5 the spring seat 100a is provided with a relatively longer pilot seat 108a, thus adding mass to the overall seat.

Considering now the heat-dissipating characteristics of the clutch assembly, as previously stated, due to the presence of a suitable grease or lubricant within the casing 16, considerably less frictional heat will be generated when clutch slippage takes place than would be the case with a dry clutch assembly of similar design. Whatever heat may be generated will be evenly distributed throughout the interior of the casing 16 by virtue of a pumping action which will take place as the various rollers 84 reciprocate radially within the slots 86 provided for them in the roller cage structure afforded by the casing section 20. The fluid is thus caused to move alternately in opposite direction as in each quadrant of the casing structure along a patch extending from the slot 86 through the annulus existing between the inner cylindrical face of the casing wall and the outer cylindrical face of the casing section 20, to the adjacent slots or oil grooves 110 on each side of the slot 86. The annular rings 112 are formed of a high heat conductive material and these rings assist in dissipating heat of conduction and radiation into the moving fluid lubricant. Furthermore the rings 112 serve to effectively shield the roller bearing units 80 from radiated heat. Additionally, the various ribs 28 and 50 on the external surfaces of the casing sections 18 and 20 assimilate internal heat which may be generated within the casing 16 and dissipate the same to the ambient atmosphere.

While one specific embodiment of a centrifugal clutch mechanism constructed in accordance with the principles of the present invention has been shown and described herein for illustrative purposes with certain alternative or substitute parts therefor also being shown, it will be understood that the illustrated form of the invention does not indicate all the different forms of apparatus suitable for the functions intended; the form illustrated being only one of those which have been developed for commercial application.

The invention is not to be understood as restricted to the details set forth since these may be modified within the scope of the appended claims without departing from the spirit and scope of the invention.

Having thus described the invention what I claim as new and desire to secure by Letters Patent is:

1. In a torque limiting clutch assembly for limiting the application of torque from a rotary input shaft to a rotary output shaft, in combination, a casing having a generally cylindrical wall and spaced end walls defining an internal chamber, a cam shaft rotatably journalled in said casing and projecting through one of said end walls, said cam shaft being arranged for connection to one of said shafts, said casing being arranged for connection to the other of said shafts, one of said end walls being formed with a cylindrical partition wall within the chamber dividing the latter into an inner central compartment and a surrounding outer annular compartment, a cam on said cam shaft within the inner compartment, said partition wall being formed with a plurality of circumferentially spaced radial openings therethrough, a cam follower member slidable radially in each opening and arranged to bear directly against said cam, said cam presenting to said followers a series of cam lobes and intervening cam depressions, means yieldingly urging each cam follower into engagement with said cam, and a fluid lubricant substantially filling said chamber, and passage means establishing fluid communication between said inner compartment and the surrounding annular compartment, said radial openings in the partition wall, and said passage means, in combination with said annular compartment, establishing a plurality of fluid paths for the movement of fluid lubricant under the motivating influence of said cam followers as the latter slide relative to said cam upon the occurrence of a resisting torque exceeding a predetermined limiting value.

2. In a torque limiting clutch assembly for limiting the application of torque from a rotary input shaft to a rotary output shaft, the combination set forth in claim 1 wherein said passage means comprises a second series of openings in said partition wall in intervening relation to the openings of the first series.

3. In a torque limiting clutch assembly for limiting the application of torque from a rotary input shaft to a rotary output shaft to a predetermined value, in combination, a casting having a generally cylindrical wall and spaced end walls defining an internal chamber, a cam shaft rotatably journalled in said casing and projecting through one of said end walls, said cam shaft being arranged for connection to one of said shafts, one of said end walls being formed with a cylindrical partition wall within the chamber dividing the latter into an inner central compartment and a surrounding outer annular compartment, a cam on said cam shaft within the inner compartment, said partition wall being formed with a plurality of circumferentially spaced radial openings therethrough, a cam follower member slidable radially in each opening and arranged to bear directly against said cam, said cam presenting to said followers a series of cam lobes and intervening cam depressions, there being a series of radial bores in the cylindrical wall of said casing, one for each of said radial openings in the partition wall and in radial alignment therewith, a cylindrical tubular spring retainer for each bore, each retainer having an open end removably and sealingly secured in one of said bores, an end wall closing the other end of the retainer, a compression spring centered in each retainer and having one end bearing effectively against the end wall thereof and its other end bearing effectively against one of said cam follower members, a fluid lubricant within said chamber, and passage means establishing fluid communication between said inner compartment and the surrounding annular compartment, said radial openings and said passage means, in combination with said annular compartment, establishing a plurality of fluid paths for the movement of fluid lubricant under the motivating influence of said cam followers as the latter slide relative to said cam upon occurrence of a resisting torque exceeding said predetermined limiting value.

4. In a torque limiting clutch assembly for limiting the application of torque from a rotary input shaft to a rotary output shaft to a predetermined value, the combination set forth in claim 3 wherein said passage means comprises a second series of openings in said partition wall in intervening relation to the openings of the first series.

5. In a torque limiting clutch assembly for limiting the application of torque from a rotary input shaft to a rotary output shaft to a predetermined value, the combination set forth in claim 4 including, additionally, a series of shims selectively receivable between said one end of each spring and the adjacent retainer end wall for varying the effective rate of the spring.

6. In a torque limiting clutch assembly for limiting the application of torque from a rotary input shaft to a rotary output shaft to a predetermined value, the combination set forth in claim 4 including, additionally, a series of shims selectively receivable between said one end of each spring and the adjacent retainer end wall for varying the effective rate of the spring, and a plurality of interchangeable seat members having different effective masses selectively receivable between the other end of each spring and its adjacent cam follower member.

7. In a torque limiting clutch assembly for limiting the application of torque from a rotary input shaft to a rotary output shaft to a predetermined degree, in combination, a casing having a generally cylindrical wall, and spaced end walls defining an internal chamber, a cam shaft rotatably journalled in said casing and projecting through one of said end walls, said cam shaft being arranged for connection to one of said shafts, one of said end walls being formed with a cylindrical partition wall within the chamber dividing the latter into an inner central compartment and a surrounding outer annular compartment, a cam on said cam shaft within the inner compartment, said partition wall being formed with a plurality of circumferentially spaced radial openings therethrough, a cylindrical cam follower roller slidable radially in each opening and arranged to bear directly against said cam, said cam presenting to said followers a series of cam lobes and intervening cam depressions, there being a series of radial openings in the cylindrical wall of said casing, one for each of said radial openings in the partition wall and in radial alignment therewith, a cylindrical tubular spring retainer for each bore, each retainer having an open end removably and sealingly secured in one of said openings, an end wall closing the other end of the retainer, a compression spring centered in each retainer and having one end bearing effectively against the end wall thereof, and a seat member interposed between the other end of said spring and one of said cam follower rollers, said seat member being of disk-like configuration and having a semi-cylindrical seat surface formed in one side thereof into which said one cam follower roller fits in sliding relationship, and a pilot lug for said spring formed on the other side of the seat member.

8. In a torque limiting clutch assembly for limiting the application of torque from a rotary input shaft to a rotary output shaft to a predetermined value, in combination, a casing having a generally cylindrical wall and spaced end walls defining an internal chamber, a cam shaft rotatably journalled in said casing and projecting through one of said end walls, said cam shaft being arranged for connection to one of said shafts, a bearing support carried by each end wall and by means of which the cam shaft is journalled in the casing, one of said end walls being formed with a cylindrical partition wall within the chamber dividing the latter into an inner central compartment and a surrounding annular compartment, a cam on said cam shaft within said inner compartment and intermediate the bearing supports, said partition wall being formed with a plurality of circumferentially spaced radial openings therethrough, a cam follower member slidable radially in each opening and arranged to bear directly against said cam, said cam presenting to said followers a series of cam lobes and intervening cam depressions, there being a series of radial bores in the cylindrical wall of said casing, one for each of said radial openings in the partition wall and in radial alignment therewith, a cylindrical spring retainer for each bore, each retainer having an open end removably and sealingly secured in one of said bores, and an end wall closing the other end of the retainer, a compression spring centered within each retainer and having one end bearing effectively against the end wall thereof and its other end bearing effectively against one of said cam follower members, a fluid lubricant within said chamber, passage means establishing fluid communication between the inner compartment and the surrounding annular compartment, said radial openings and said passage means, in combination with said annular compartment, establishing a plurality of fluid paths for the movement of fluid lubricant under the pumping influence of said cam followers as the latter slide relative to said cam upon occurrence of a resistance torque exceeding said limiting value, and a pair of heat-dissipating rings surrounding said cam shaft on opposite sides of said cam and interposed between said cam and said bearing supports respectively.

References Cited in the file of this patent
UNITED STATES PATENTS

| 2,164,870 | De Salardi | July 4, 1939 |
| 2,501,648 | Odgen | Mar. 21, 1950 |
| 2,668,426 | Hoover | Feb. 9, 1954 |
| 2,831,383 | Riess | Apr. 22, 1958 |